(12) United States Patent  (10) Patent No.: US 7,467,763 B2
Kismarton  (45) Date of Patent: Dec. 23, 2008

(54) COMPOSITE LANDING GEAR APPARATUS AND METHODS

(76) Inventor: Max U. Kismarton, 14227 SE. 163rd Pl., Renton, WA (US) 98058

( * ) Notice: Subject to any disclaimer, the term of this patent is extended or adjusted under 35 U.S.C. 154(b) by 191 days.

(21) Appl. No.: 11/145,058

(22) Filed: Jun. 3, 2005

(65) Prior Publication Data

US 2006/0284009 A1 Dec. 21, 2006

(51) Int. Cl.
*B64C 25/62* (2006.01)

(52) U.S. Cl. .............................. 244/104 LS; 244/100 R

(58) Field of Classification Search ........... 244/104 LS, 244/108, 100 R, 104 R, 103 R; 446/55
See application file for complete search history.

(56) References Cited

U.S. PATENT DOCUMENTS

| | | | |
|---|---|---|---|
| 2,108,041 A | | 2/1938 | Colvin, Jr. |
| 2,498,976 A | * | 2/1950 | Wittman .................. 244/104 R |
| 2,534,722 A | * | 12/1950 | Meiklejohn, Jr. et al. ...... 267/41 |
| 2,611,564 A | * | 9/1952 | Geisse .................... 244/103 W |
| 3,238,690 A | * | 3/1966 | Wilkins ..................... 52/730.7 |
| 3,266,130 A | | 8/1966 | Glaze |
| 3,381,484 A | | 5/1968 | Laughlin |
| 3,490,983 A | | 1/1970 | Lee |
| 3,768,760 A | | 10/1973 | Jensen |
| 3,975,916 A | | 8/1976 | Watson |
| 3,983,900 A | | 10/1976 | Airhart |
| 4,084,029 A | | 4/1978 | Johnson et al. |
| 4,098,559 A | | 7/1978 | Price |
| 4,198,018 A | | 4/1980 | Brault |
| 4,207,778 A | | 6/1980 | Hatch |
| 4,232,844 A | | 11/1980 | Sobey |
| 4,310,132 A | | 1/1982 | Robinson et al. |
| 4,368,234 A | | 1/1983 | Palmer et al. |
| 4,413,110 A | | 11/1983 | Kavesh et al. |
| 4,627,791 A | | 12/1986 | Marshall |

(Continued)

FOREIGN PATENT DOCUMENTS

DE 202004007601 U1 12/2004

(Continued)

OTHER PUBLICATIONS

Garfinkle et al., "Aerospace: Smart Spars, Intrinsically-Smart Composite Structures", Fiber Architects, High Performance Textile Consultants, http://fiberarchitects.com/aerospace/spar.html, pp. 1-8, Jan. 1999.

(Continued)

*Primary Examiner*—Tien Dinh

(57) ABSTRACT

Composite landing gear apparatus and methods are disclosed. In one embodiment, a composite component includes an elongated member having a first composite portion coupled to a second composite portion by a pair of composite sidewall portions and forming an elongated cavity therebetween. The first composite portion includes a plurality of first layers, each first layer having a plurality of first fibers disposed therein. Similarly, the second composite portion includes a plurality of second layers, each second layer having a plurality of second fibers disposed therein. The first and second fibers are oriented substantially parallel to a longitudinal axis of the elongated cavity. The composite sidewall portions include a plurality of third layers each third layer having a plurality of third fibers disposed therein, the third fibers being cross-woven and non-parallel with the longitudinal axis.

8 Claims, 4 Drawing Sheets

U.S. PATENT DOCUMENTS

| | | | |
|---|---|---|---|
| 4,712,533 A | 12/1987 | Cruise | |
| 4,734,146 A | 3/1988 | Halcomb et al. | |
| 4,741,943 A | 5/1988 | Hunt | |
| 4,808,461 A | 2/1989 | Boyce et al. | |
| 4,966,802 A | 10/1990 | Hertzberg | |
| 5,096,772 A | 3/1992 | Snyder | |
| 5,154,370 A | 10/1992 | Cox et al. | |
| 5,164,255 A | 11/1992 | Weeks | |
| 5,251,848 A * | 10/1993 | Gannatal | 244/103 S |
| 5,269,657 A | 12/1993 | Garfinkle | |
| 5,306,557 A | 4/1994 | Madison | |
| 5,333,568 A | 8/1994 | Meldner et al. | |
| 5,362,345 A | 11/1994 | Stettler et al. | |
| 5,429,066 A | 7/1995 | Lewit et al. | |
| 5,476,704 A | 12/1995 | Kohler | |
| 5,538,781 A | 7/1996 | Rao et al. | |
| 5,632,940 A | 5/1997 | Whatley | |
| 5,669,999 A | 9/1997 | Anderegg et al. | |
| 5,766,724 A | 6/1998 | Tailor et al. | |
| 5,833,786 A | 11/1998 | McCarville et al. | |
| 5,958,550 A | 9/1999 | Childress | |
| 5,972,524 A | 10/1999 | Childress | |
| 6,024,325 A | 2/2000 | Carter, Jr. | |
| 6,037,060 A | 3/2000 | Blohowiak et al. | |
| 6,114,050 A | 9/2000 | Westre et al. | |
| H1872 H | 10/2000 | Bowman | |
| 6,277,463 B1 | 8/2001 | Hamilton et al. | |
| 6,306,239 B1 | 10/2001 | Breuer et al. | |
| 6,320,118 B1 | 11/2001 | Pridham et al. | |
| 6,355,584 B1 | 3/2002 | Corrons | |
| 6,405,978 B1 | 6/2002 | Dean et al. | |
| 6,436,507 B1 | 8/2002 | Pannell | |
| 6,554,225 B1 | 4/2003 | Anast et al. | |
| 6,565,944 B1 | 5/2003 | Hartness et al. | |
| 6,641,693 B2 | 11/2003 | Guckert et al. | |
| 6,641,893 B1 | 11/2003 | Suresh et al. | |
| 6,655,633 B1 | 12/2003 | Chapman, Jr. | |
| 6,703,118 B2 | 3/2004 | van Weperen et al. | |
| 6,779,830 B2 | 8/2004 | Patberg et al. | |
| 6,835,341 B2 | 12/2004 | Noda et al. | |
| 6,886,780 B1 * | 5/2005 | Frontera Castaner | 244/104 LS |
| 6,914,021 B2 | 7/2005 | Sidwell | |
| 2003/0148082 A1 | 8/2003 | Bompard et al. | |
| 2003/0189131 A1 | 10/2003 | Cloud et al. | |
| 2004/0024502 A1 | 2/2004 | Squires et al. | |
| 2004/0213952 A1 | 10/2004 | Takemura et al. | |
| 2005/0153098 A1 | 7/2005 | Bhatnagar et al. | |
| 2005/0250440 A1 | 11/2005 | Zhou et al. | |
| 2006/0237588 A1 | 10/2006 | Kismarton | |

FOREIGN PATENT DOCUMENTS

| | | |
|---|---|---|
| EP | 0433686 A1 | 6/1991 |
| EP | 1174533 A1 | 1/2002 |
| EP | 1336469 A1 | 8/2003 |
| EP | 1762666 A1 | 3/2007 |
| FR | 2660892 | 10/1991 |
| GB | 2238977 A | 6/1991 |
| JP | 2003066968 | 3/2003 |
| WO | WO9640551 | 12/1996 |
| WO | WO0216197 A1 | 2/2002 |
| WO | WO0216784 A2 | 2/2002 |

OTHER PUBLICATIONS

UK Intellectual Property Office Combined Search and Examination Report for Application No. GB0716242.3, mailed on Nov. 16, 2007, 8 pgs.

Gay, Materiaux Composites, Hermes, Paris, 4th edition, 1997, pp. 107-109.

* cited by examiner

| | $\epsilon_t$ | $\epsilon_c$ | DENSITY | MODULUS(E) |
|---|---|---|---|---|
| CB | 0.008 | 0.006 | 0.055 | 20 |
| $GS_1$ | 0.025 | 0.020 | 0.075 | 5 |
| $P_1$ | 0.035 | 0.025 | 0.035 | 5 |

COMPOSITE LANDING GEAR APPARATUS AND METHODS

GOVERNMENT LICENSE RIGHTS

This invention was made with Government support under contract number MDA972-98-9-0004 awarded by the Defense Advanced Research Projects Agency. The government has certain rights in this invention.

FIELD OF THE INVENTION

This invention relates to composite structures, and more specifically, to composite landing gear apparatus and methods, including composite landing gear for manned and unmanned aerial vehicles, both fixed wing and rotary lift systems.

BACKGROUND OF THE INVENTION

Composite components are being utilized in a wide variety of articles of manufacture due to their high strength and lightweight. This is particularly true in the field of aircraft manufacturing. Typical materials used in the manufacture of composite components include glass or graphite fibers that are embedded in resins, such as phenolic, epoxy, and bismaleimide resins. The fiber and resin materials may be formed into a desired shape using a variety of different manufacturing systems and processes, and may then be cured (e.g. under elevated pressure and temperature conditions) to produce the desired component.

Although desirable results have been achieved, there is room for improvement. For example, although composite components may provide the desired strength characteristics, under some circumstances, such composite components may fail to provide other desirable properties, including flexibility. Therefore, for some applications, prior art composite components may be unsuitable despite their desirable weight and strength characteristics.

SUMMARY OF THE INVENTION

The present invention is directed to composite landing gear apparatus and methods, including composite landing gear for manned and unmanned aerial vehicles. Embodiments of apparatus and methods in accordance with the present invention may advantageously provide landing gear assemblies having significantly enhanced structural performance, substantially reduced weight, and substantially reduced cost, in comparison with prior art landing assemblies In one embodiment, a composite component includes an elongated member having a first composite portion coupled to a second composite portion by a pair of composite sidewall portions and forming an elongated cavity therebetween. The first composite portion includes a plurality of first layers, each first layer having a plurality of first fibers disposed therein. Similarly, the second composite portion includes a plurality of second layers, each second layer having a plurality of second fibers disposed therein. The first and second fibers are oriented substantially parallel to a longitudinal axis of the elongated cavity. The composite sidewall portions include a plurality of third layers each third layer having a plurality of third fibers disposed therein, the third fibers being cross-woven and non-parallel with the longitudinal axis.

BRIEF DESCRIPTION OF THE DRAWINGS

Preferred and alternate embodiments of the present invention are described in detail below with reference to the following drawings.

DETAILED DESCRIPTION

The present invention relates to composite landing gear apparatus and methods, including composite landing gear for unmanned aerial vehicles. Many specific details of certain embodiments of the invention are set forth in the following description and in FIGS. 1-8 to provide a thorough understanding of such embodiments. The present invention may have additional embodiments, or may be practiced without one or more of the details described for any particular described embodiment.

Figure 1:
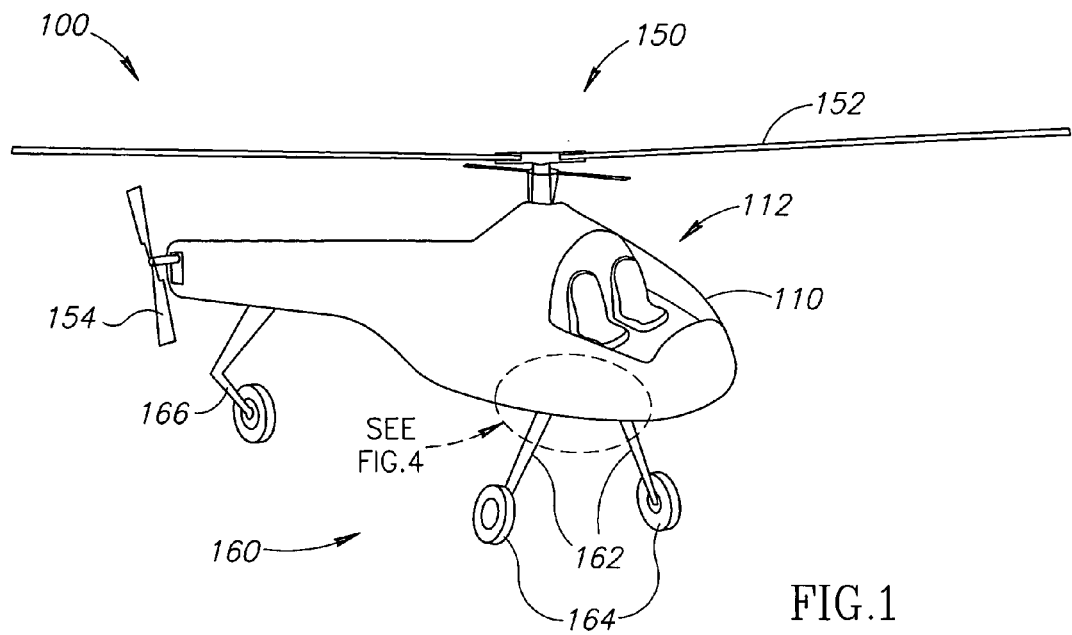
FIG. 1 is an isometric view of an aircraft having a landing gear assembly in accordance with an embodiment of the invention.

FIG. 1 is an isometric view of an aircraft 100 in accordance with an embodiment of the invention. In this embodiment, the aircraft 100 includes a fuselage 110 and a rotary lift and propulsion system 150 having a main rotor 152 and a tail rotor 154. A landing gear assembly 160 projects outwardly from the fuselage 110 and includes a pair of composite legs 162. A landing wheel 164 is operatively coupled to each composite leg 162 and a tail landing gear 166 projects downwardly from an aft portion of the fuselage 110. Alternately, the aircraft 100 may be any type of aircraft having a landing gear assembly, including landing gear assemblies having composite components. As shown in FIG. 1, the aircraft 100 may include a cockpit 112 disposed in a forward portion of the fuselage for manned operations. In alternate embodiments, however, the cockpit 112 may be eliminated.

Figure 2:
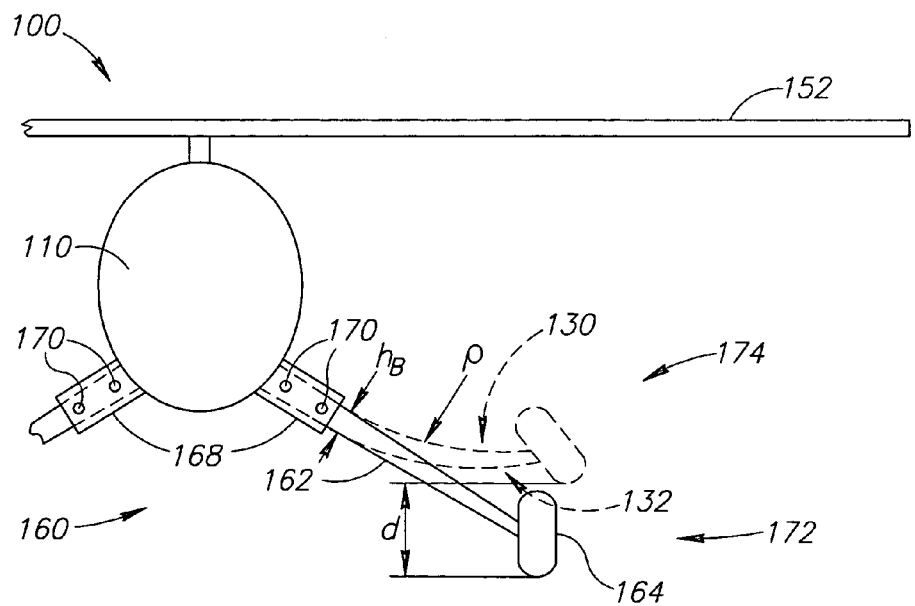
FIG. 2 is a front elevational schematic view of a portion of the aircraft of FIG. 1.
Figure 3:
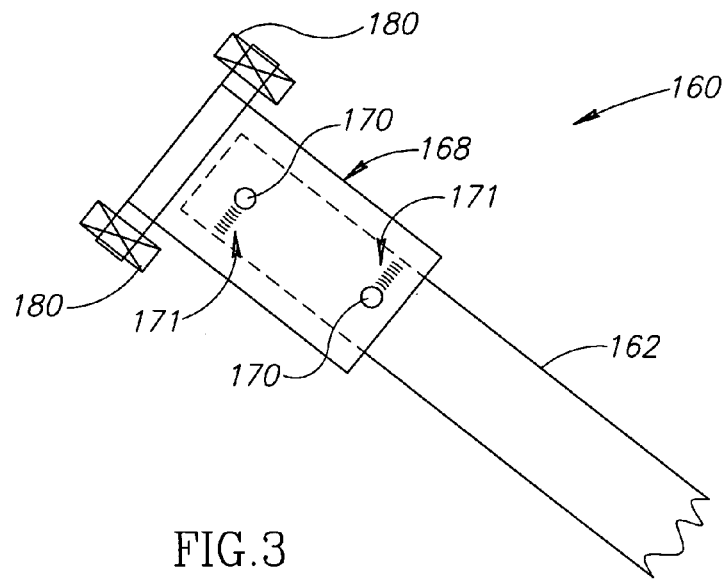
FIG. 3 is an enlarged, partial elevational view of a portion of the landing gear assembly of FIG. 1.

FIG. 2 is a front schematic view of the aircraft 100 and landing gear assembly 160 of FIG. 1. FIG. 3 is an enlarged, partial elevational view of a portion of the landing gear assembly 160 of FIG. 2. In this embodiment, each of the composite legs 162 is slideably disposed into a box-like receiving member 168 coupled to the fuselage 110. A pair of attachment members 170 are disposed through each receiving member 168 and composite leg 162, securing each composite leg 162 to its corresponding receiving member 168. In a first (or non-loaded) position 172, such as just prior to landing or shortly after takeoff, each of the composite legs 162 projects downwardly in a relaxed (or non-loaded) orientation to ensure that the landing wheels 164 are in a proper position for landing or take off. In a second (or loaded) position 174, however, each of the composite legs 162 may be bent upwardly by the forces associated with landing the aircraft 100. The amount of upward bending of each composite leg 162 depends upon several variables, including the weight of the aircraft 100, the vertical landing velocity, and the flexibility of the composite legs 162.

As shown in FIG. 2, the upward bending of each composite leg 162 may be characterized by a radius of curvature ρ of the composite leg 162, and also by a deflection distance d which is the distance the landing wheel 164 is deflected upwardly between the non-loaded position 172 and the loaded position 174. The radius of curvature ρ of the composite leg 162 may be estimated by the following equation:

$$\rho = h_B/(\epsilon_t + \epsilon_c) \qquad (1)$$

where $h_B$ is a dimension (or beam height) of the composite leg 162, $\epsilon_t$ is a strain in tension of the composite leg 162, and $\epsilon_c$ is a strain in compression of the composite leg 162.

As further shown in FIG. 3, in this embodiment, the receiving member 168 includes a structurally-weakened portion (or "plow field") 171 proximate each of the attachment members 170. The structurally-weakened portions 171 may be adapted to provide the necessary strength and rigidity characteristics for the nominal loads experienced during normal flight and normal landing operations. The structurally-weakened portions 171 may be further adapted, however, to intentionally "fail," deform, bend, or otherwise "give way" under certain non-nominal load conditions, such as those that may be experienced during an abnormally hard landing. In one particular embodiment, for example, the structurally-weakened portions 171 are adapted to fail at a design point that is selected based on the load limit of the composite leg 162. In other words, the structurally-weakened portions 171 may be adapted to fail prior to a failure point of the composite leg 162, thereby absorbing some of the energy of impact associated with an abnormally hard landing, and possibly preventing breakage of the composite leg 162.

Figure 4:
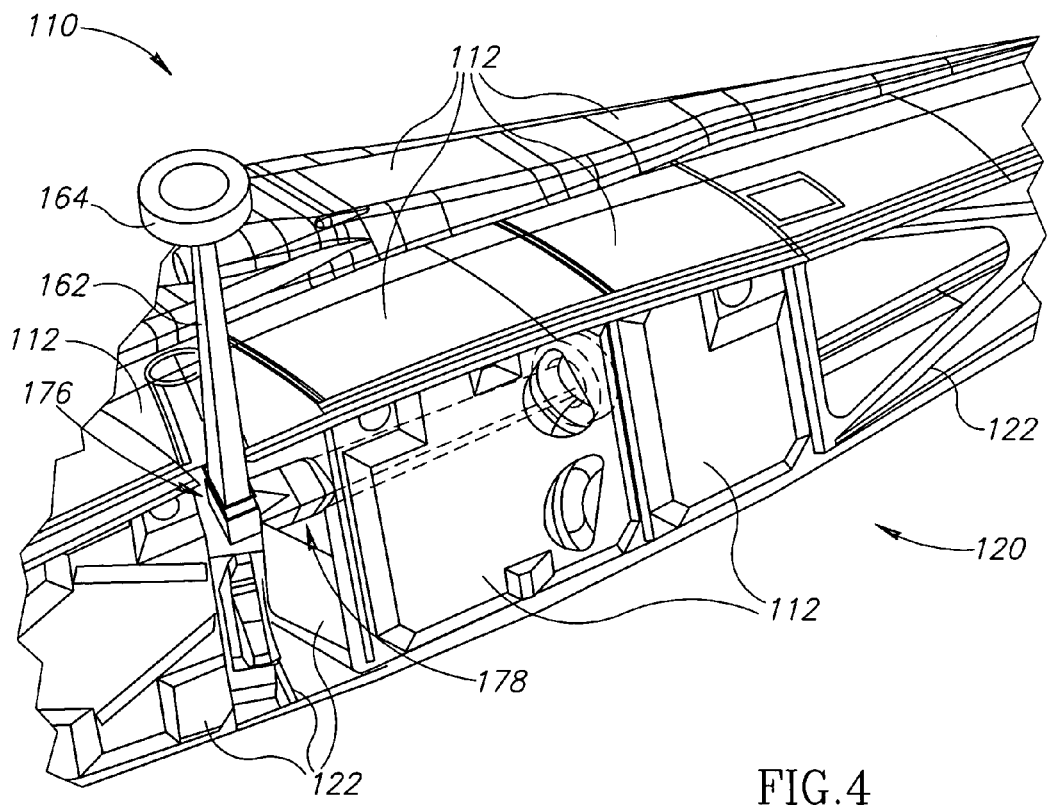
FIG. 4 is an enlarged, partial isometric view of a portion of aircraft of FIG. 1.

FIG. 4 is an enlarged, partial isometric view of a portion of the aircraft 100 of FIG. 1. In this embodiment, the fuselage 110 of the aircraft 100 includes a plurality of fuselage components 112 that are coupled to a frame assembly 120. The frame assembly 120 includes a plurality of frame members 122. In one embodiment, at least some of the fuselage components 112 and frame members 122 are formed of composite materials. More specifically, in one particular embodiment, at least some of the fuselage components 112 are asymmetric composite components that may be formed in accordance with the apparatus and methods disclosed in co-pending, commonly-owned U.S. patent application Ser. No. (to be determined) entitled "Methods and Systems for Manufacturing Composite Components" filed under Ser. No. 11/144,146, which application is incorporated herein by reference.

Figure 5:
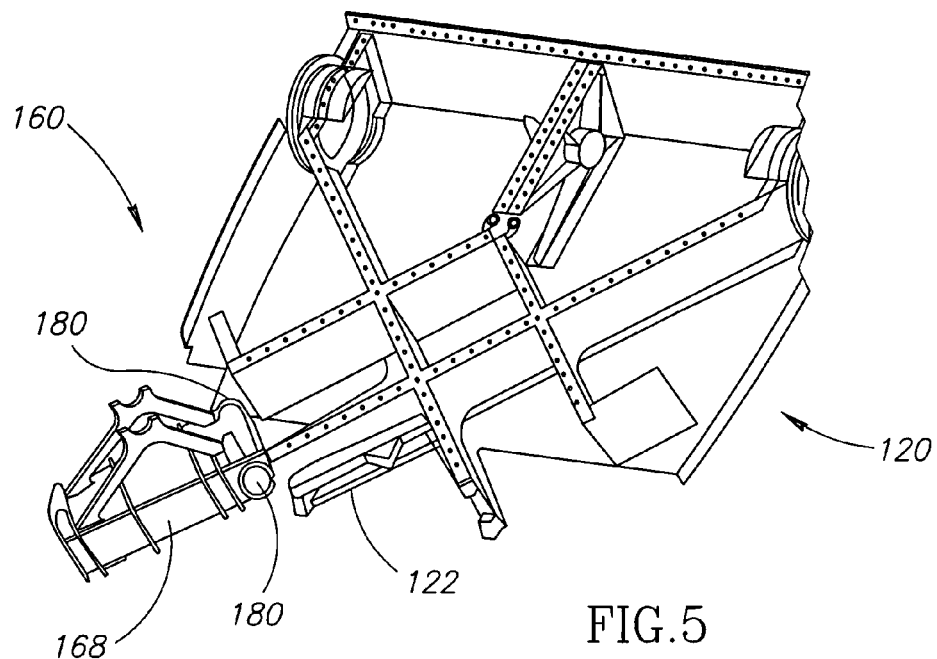
FIG. 5 is an isometric, exploded view of a portion of the landing gear assembly of FIG. 2.

In some embodiments, the landing gear assembly 160 may be moved between a landing (or deployed) position 176 and a flight (or stowed) position 178. For example, FIG. 5 is an isometric, partially-exploded view of a portion of the landing gear assembly 160 of FIG. 2. More specifically, FIG. 5 is a view of one of the box-like receiving members 168 and one of the frame members 122 to which it is normally coupled (shown separated from the frame member 122 in the exploded view in FIG. 5). As shown in FIGS. 3 and 5, in this embodiment, each receiving member 168 is pivotably coupled to one of the frame members 122 by a pair of bearings 180. The bearings 180 enable the receiving members 168, and thus the composite legs 162, to be moved between the landing position 176 and the flight position 178 (FIG. 4) by a suitable actuator (not shown).

Figure 6:
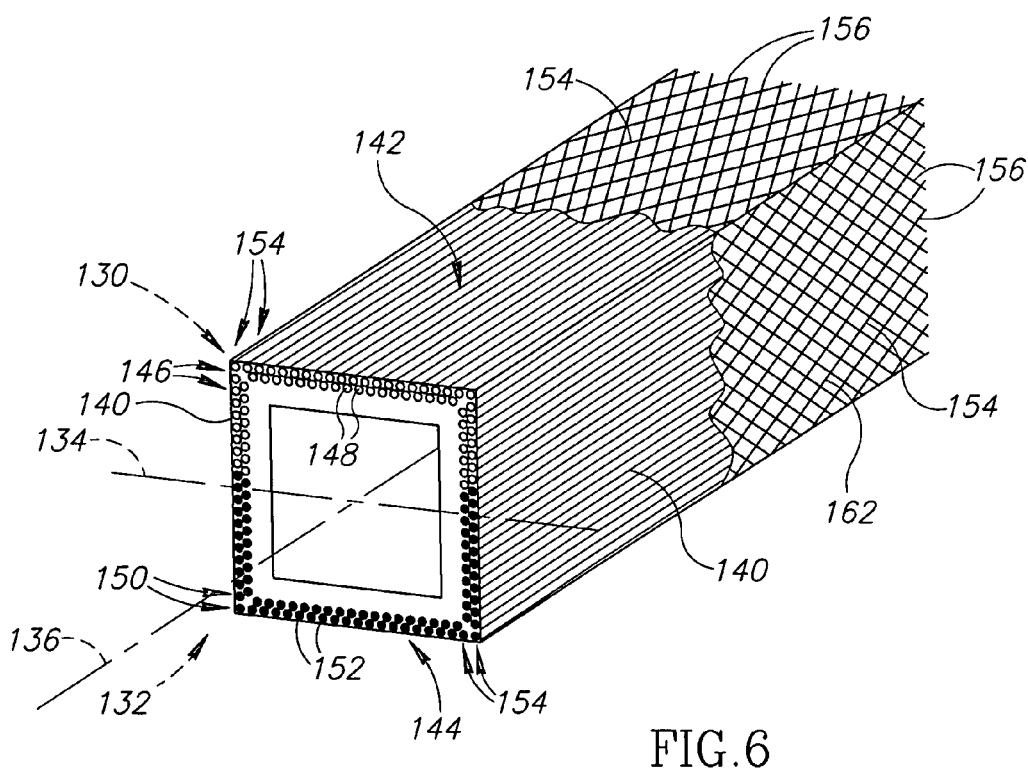
FIG. 6 is an isometric, cross-sectional view of a composite leg of the landing gear assembly of FIG. 1.

With reference to FIG. 2, in the loaded position 174 (e.g. during landing), the composite leg 162 includes an upper portion 130 that experiences compression loads, and a lower portion 132 that experiences tension loads. More specifically, FIG. 6 is an isometric, cross-sectional view of the composite leg 162 of FIG. 2. In this embodiment, the composite leg 162 has an approximately square cross-sectional shape. A reference plane 134 bisects the composite leg 162, and a longitudinal axis 136 extends along a centerline of the composite leg 162. The composite leg 162 includes a pair of sidewalls 140, and upper wall 142, and a lower wall 144. The upper portion 130 that experiences compression loads in loading position 174 includes the upper wall 142 and the upper portions of the sidewalls 140, while the lower portion 132 that experiences tension loads includes the lower wall 144 and the lower portions of the sidewalls 140. The upper and lower portions 130, 132 are not necessarily separated by the reference plane 134. For example, in the embodiment shown in FIG. 6, the lower portion 132 extends from below the reference plane 134 to slightly above the reference plane 134.

As further shown in FIG. 6, the composite leg 162 generally includes a plurality of fiber-reinforced layers. In some of the layers, the fibers are oriented approximately parallel with the longitudinal axis 136, while in other layers, the fibers are oriented at angles (i.e. non-parallel) with respect to the longitudinal axis 136. More specifically, in this embodiment, the upper portion 130 includes a plurality of first layers 146 each having a plurality of first fibers 148 oriented approximately parallel with the longitudinal axis 136. Similarly, the lower portion 132 includes a plurality of second layers 150 each having a plurality of second fibers 152 oriented approximately parallel with the longitudinal axis 136. A third layer 154 having a plurality of third fibers 156 forms an outer surface of the composite leg 162. The third fibers 156 are cross-woven and are oriented at an angle (e.g. ±45 degrees) with respect to the longitudinal axis 136. Additional third layers 154 may be interspersed among the first and second layers 146, 150 throughout the upper and lower portions 130, 132 as desired.

In accordance with various embodiments of the present invention, the first and second fibers 148, 152 may be formed of one or more materials having relatively higher strength in compression and/or tension in comparison with the third fibers 156. For example, in one embodiment, the first and second fibers 148, 152 are formed of a glass material (GS), while the third fibers 156 are formed from carbon (CB), respectively. Alternately, the first fibers 148 may be formed of a glass material (GS) while the second fibers 152 may be formed from a plastic (or organic) material (P). For example, in one particular embodiment, the second fibers 152 may be polyethylene fibers, including, for example, high molecular weight polyethylene fibers, such as those fibers commercially-available under the trademark SPECTRA® from Honeywell International, Inc. of Morristown, N.J. In alternate embodiments, the second fibers 152 may be other suitable high-strength plastic fibers, including those PBO (p-phenylene benzobisoxazole) fibers commercially-available under the trademark ZYLON® from Aramid, Ltd. of Hilton Head, S.C., or those polyarylate fibers commercially-available under the trademark VECTRAN® from Kuraray Co, Ltd. of Tokyo, Japan.

Figures 7, 8:
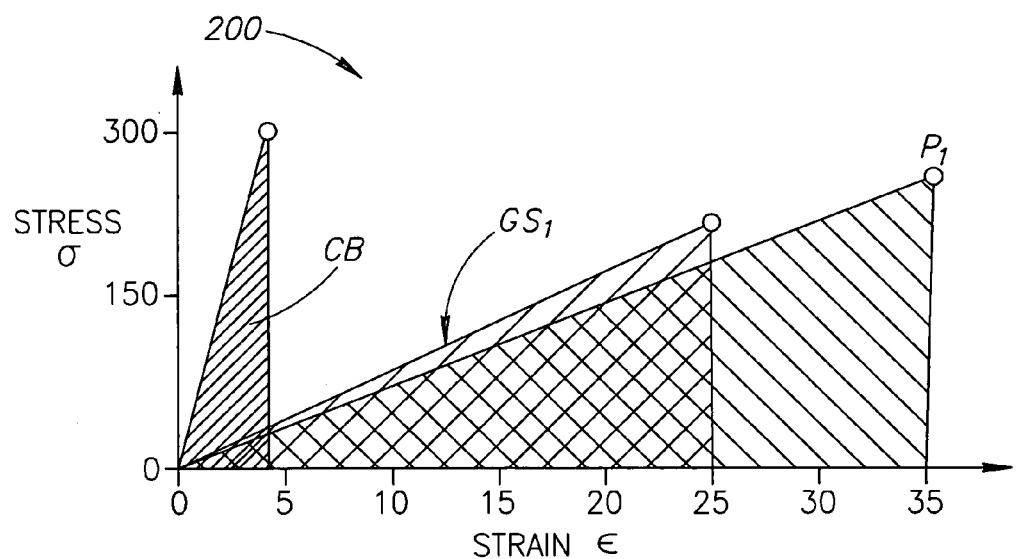
FIG. 7 is a representative graph of stress versus strain for carbon, a glass, and a plastic material.
FIG. 8 is a representative table of various material properties for various fiber materials.

FIG. 7 is a representative graph 200 of stress versus strain for carbon (CB), a glass ($GS_1$), and a plastic ($P_1$) material. Similarly, FIG. 8 is a representative table 300 of various material properties for various fiber materials, including carbon (CB), a glass ($GS_1$), and a plastic ($P_1$). With reference to FIG. 7, the area under the stress versus strain curve for each material represents the amount of energy that may be absorbed by the material during an impact, such as during landing. It can be seen that the glass material ($GS_1$) can absorb more energy than carbon (CB), and the plastic material ($P_1$) can absorb more energy then both the glass material ($GS_1$) and carbon (CB). Furthermore, FIG. 8 shows that the glass material is more dense (i.e. heavier) than carbon, while the plastic material ($P_1$) is less dense (i.e. lighter) than both carbon (CB) and the glass material ($GS_1$). It will be appreciated that by proper selection of the first and second fibers 148, 152, the upper portion 130 may be adapted to exhibit desired compression strength characteristics (e.g. a desired $\epsilon_c$), and the lower portion 132 may be adapted to exhibit desired tensile strength characteristics (e.g. a desired $\epsilon_t$).

While the upper and lower walls 142, 144 of the composite leg 162 are adapted to provide desired compression and tensile strength characteristics, the sidewalls 140 may be suitably adapted to provide torsional rigidity of the composite leg 162. For example, the sidewalls 140 may be adapted to provide enough torsional rigidity to substantially prevent wobble in order to allow the landing wheels 164 to track properly during landing of the aircraft 100. Therefore, a relatively greater number of third layers 154 may be disposed within the sidewalls 140 of the composite leg 162.

The third fibers 156 within the third layers 154 may be oriented at any desired angular values with respect to the longitudinal axis 136. In specific embodiments, for example, the third fibers 156 within the third layers 154 may be oriented at angles of ±5 degrees, ±30 degrees, ±45 degrees, ±60 degrees, ±65 degrees, or any other desired angular values ranging from 0 to 90 degrees. Additional design details of the structure and composition of further possible embodiments of the first, second, and third layers 146, 150, 154 are described more fully in co-pending, commonly-owned U.S. patent application Ser. No. 11/118,594 entitled "Composite Skin and Stringer Structure and Method for Forming the Same," U.S. patent application Ser. No. 11/096,743 entitled "Composite Structural Member and Method for Forming the Same," U.S. patent application Ser. No. 11/096,796 entitled "Hybrid Fiberglass Composite Structures and Methods for Forming the Same," U.S. patent application Ser. No. 11/096,727 entitled "Multi-Axial Laminate Composite Structures and Methods of Forming the Same," and U.S. patent application Ser. No. 11/096,795 entitled "Composite Structural Member Having an Undulating Web and Method for Forming the Same," which applications are incorporated herein by reference.

In one particular embodiment, fiberglass unidirectional tape (or glass planks) (e.g. E-glass) with a modulus of approximately 5 MSI may be used to form the upper and lower portions 130, 132 of the composite leg 162 (e.g. within the third layer 154) to achieve very high deflections required for energy absorption. Similarly, graphite (GR) bidirectional weave (e.g. T-300 at ±45 degrees) may be used to interleave the glass planks to transfer sheer, provide torsional rigidity (for improved ground handling stability of the aircraft 100), and to prevent transverse cracking of the glass planks and to improve transition of the loads into the attachment members 170. The resulting embodiment of the composite leg 162 may flex a substantial amount. In one particular embodiment, strain levels exceeding 20,000 micro-inch may be achieved.

Embodiments of the present invention may provide significant advantages over the prior art. For example, current aircraft have well-developed landing gear assemblies that may be undesirably heavy. A traditional landing gear assembly typically weighs between about 5 to 10 percent of max takeoff weight. Embodiments the present invention, however, may weigh between about 2 to 5 percent of max takeoff weight, a weight savings (and cost savings) of approximately 50%. Also, more traditional landing gear assemblies typically use steel forgings which require relatively expensive tooling. Embodiments of the present invention may have significantly lower tooling costs.

Also, because the composite legs 162 use a hybrid material system that includes high elongation fibers within the lower portion 132, high compression fibers within the upper portion 130, and relatively-stiff fiber-reinforced layers within the sidewalls 140 for torsional rigidity, the composite legs 162 may provide significantly enhanced structural performance in comparison with prior art landing assemblies. Composite legs in accordance with the present invention may flex a substantial amount to absorb energy during abnormal landing conditions, yet may still maintain highly desirable strength and weight characteristics. For example, in some embodiments, strain levels exceeding 20,000 micro-inch may be achieved, compared with strain levels of 5000 micro-inch of more traditional aircraft composite structures. Furthermore, because the receiving member 168 includes the structurally-weakened portions 171, the receiving member 168 is further adapted to absorb additional energy during landing of the aircraft 100. In this way, embodiments of the present invention may advantageously prevent damage to other portions of the aircraft 100 during landing.

In the event that an abnormal landing condition causes damage to a receiving member 168 (e.g. by causing the attachment members 170 to deform the "plow fields" 171), the receiving member 168 may be easily replaced. The closed cell (or box beam) construction of the composite leg 162 suppresses free edge effects (e.g. delamination) that might otherwise occur in alternate designs due to abnormal loading conditions. Also, because the composite leg 162 is received within and attached to the retaining member 168 using a relatively simple design, repair and replacement of composite legs 162 that have been damaged is simplified. Therefore, embodiments of the present invention may improve the maintainability and overall cost of operating the aircraft 100 in comparison with prior art landing gear assemblies.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A landing gear assembly for an aircraft, comprising:
a receiving member configured to be coupled to a frame member of the aircraft, the receiving member including a receiving portion defining a receptacle, the receiving member including a structurally-weakened portion proximate the receptacle; and
an elongated member having a first end disposed within and coupled to the receptacle and a second end operatively coupled to a landing member, the elongated member further having a first composite portion coupled to a second composite portion by a pair of composite sidewall portions and forming an elongated cavity therebetween, wherein the first composite portion includes a plurality of first layers, each first layer having a plurality of first fibers disposed therein, and wherein the second composite portion includes a plurality of second layers, each second layer having a plurality of second fibers disposed therein, wherein the first and second fibers are oriented substantially parallel to a longitudinal axis of the elongated cavity, and wherein the composite sidewall portions include a plurality of third layers, each third layer having a plurality of third fibers disposed therein, the third fibers being cross-woven and non-parallel with the longitudinal axis, wherein the structurally-weakened portion is configured to structurally fail before the elongated member when a load is applied to the landing member.

2. The assembly of claim 1, wherein the elongated member comprises a square-shaped elongated member, and wherein the receptacle comprises a square-shaped receptacle.

3. The assembly of claim 1, wherein the first fibers have a greater strain of compression than the second fibers, and the second fibers have a greater strain of tension than the first fibers.

4. The assembly of claim 1, wherein the first fibers include glass fibers, the second fibers include plastic fibers, and the third fibers include carbon fibers.

5. A landing gear assembly for an aircraft, comprising:

a receiving member configured to be coupled to a frame member of the aircraft, the receiving member including a receiving portion defining a receptacle; and an elongated member having a first end disposed within and coupled to the receptacle and a second end operatively coupled to a landing member, the elongated member further having a first composite portion coupled to a second composite portion by a pair of composite sidewall portions and forming an elongated cavity therebetween, wherein the first composite portion includes a plurality of first layers, each first layer having a plurality of first fibers disposed therein, and wherein the second composite portion includes a plurality of second layers, each second layer having a plurality of second fibers disposed therein, wherein the first and second fibers are oriented substantially parallel to a longitudinal axis of the elongated cavity, and wherein the composite sidewall portions include a plurality of third layers, each third layer having a plurality of third fibers disposed therein, the third fibers being cross-woven and non-parallel with the longitudinal axis, wherein the receiving portion includes a wall member having at least one aperture disposed therein, the first end of the elongated member being coupled to the receptacle by an attachment member passing through the aperture, the wall member including a structurally-weakened portion proximate the aperture.

6. The assembly of claim 5, wherein the structurally-weakened portion is adapted to structurally fail at a first load level applied to the landing member, and wherein the elongated member is adapted to structurally fail at a second load level applied to the landing member, the first load level being lower than the second load level.

7. A landing gear assembly for an aircraft, comprising:

a receiving member adapted to be coupled to a frame member of the aircraft, the receiving member including a receiving portion defining a receptacle, wherein the receiving portion includes a wall member having at least one aperture disposed therein, the wall member including a structurally-weakened portion proximate the aperture and an elongated member having a first end disposed within the receptacle and a second end operatively coupled to a landing member, the first end of the elongated member being coupled to the receptacle by an attachment member passing through the aperture, the structurally-weakened portion being adapted to structurally fail at a first load level applied to the landing member, and the elongated member being adapted to structurally fail at a second load level applied to the landing member, the first load level being lower than the second load level.

8. The assembly of claim 7, wherein the elongated member further includes a first composite portion coupled to a second composite portion by a pair of sidewall portions and forming an elongated cavity therebetween, wherein the first composite portion includes a plurality of first layers, each first layer having a plurality of first fibers disposed therein, and wherein the second composite portion includes a plurality of second layers, each second layer having a plurality of second fibers disposed therein, wherein the first and second fibers are oriented substantially parallel to a longitudinal axis of the elongated cavity, and wherein the sidewall portions include a plurality of third layers, each third layer having a plurality of third fibers disposed therein, the third fibers being cross-woven and non-parallel with the longitudinal axis.

\* \* \* \* \*